US006453300B2

(12) United States Patent
Simpson (10) Patent No.: US 6,453,300 B2
(45) Date of Patent: *Sep. 17, 2002

(54) PERSONALIZED GREETING CARD WITH ELECTRONIC STORAGE MEDIA AND METHOD OF PERSONALIZING SAME

(75) Inventor: William S. Simpson, Lake Oswego, OR (US)

(73) Assignee: CD coupon, LLC, West Linn, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,108

(22) Filed: Aug. 19, 1999

Related U.S. Application Data (60) Provisional application No. 60/098,570, filed on Aug. 31, 1998.

(51) Int. Cl.[7] .............................................. G06F 17/60
(52) U.S. Cl. ......................................... 705/26; 700/237
(58) Field of Search ............................... 700/233, 234, 700/235, 237; 705/26, 27, 22, 54, 77

(56) References Cited

U.S. PATENT DOCUMENTS

| | | | |
|---|---|---|---|
| 4,152,865 A | | 5/1979 | Ikeda |
| 4,203,516 A | | 5/1980 | Stonoga et al. |
| 4,433,780 A | | 2/1984 | Ellis |
| 5,244,085 A | | 9/1993 | Lammerant et al. |
| 5,319,705 A | * | 6/1994 | Halter et al. ................... 380/4 |
| 5,400,319 A | * | 3/1995 | Fite et al. ................. 369/275.5 |
| 5,513,117 A | * | 4/1996 | Small ..................... 235/381 X |
| 5,515,968 A | | 5/1996 | Taniyama |
| 5,544,741 A | | 8/1996 | Fantone et al. |
| 5,588,526 A | | 12/1996 | Fantone et al. |
| 5,609,249 A | | 3/1997 | Cheng |
| 5,662,218 A | | 9/1997 | Ladwig |
| 5,694,469 A | * | 12/1997 | Lerue .............................. 380/4 |
| 5,695,053 A | | 12/1997 | Koh et al. |
| 5,703,951 A | * | 12/1997 | Dolphin ........................ 380/25 |
| 5,738,221 A | | 4/1998 | Van Witt et al. |
| 5,799,782 A | | 9/1998 | Gelardi |
| 5,823,344 A | | 10/1998 | Fantone et al. |
| 5,915,734 A | * | 6/1999 | Minehart ..................... 283/117 |
| 5,954,194 A | * | 9/1999 | Simpson ...................... 206/46 |
| 6,047,265 A | * | 4/2000 | Sugimori ...................... 705/26 |

FOREIGN PATENT DOCUMENTS

| | | | |
|---|---|---|---|
| GB | 2279295 | * | 1/1995 |
| GB | 2340447 | * | 2/2000 |

OTHER PUBLICATIONS

Jerry Lansky, "Without APS, Photo Life Goes on Via Internet", *Photographic Trade News*, p. 22, Aug. 1996.*

* cited by examiner

*Primary Examiner*—F. J. Bartuska
(74) *Attorney, Agent, or Firm*—Whiteford Taylor & Preston; Gregory M. Stone (57) ABSTRACT

Method and system for enabling a first person to produce a customized gift for a second person, including: providing a computer-readable storage medium having a control program and non-customized information stored thereon; obtaining data from the first person which relates to the second person; using the data to generate a customization code; providing the gift and the customization code to the second person; causing the control program to request the customization code from the second person; and using the customization code to select information from the non-customized information to provide a customized display to the second person. The gift is preferably purchased and customized through an Internet website or other electronic system.

30 Claims, 9 Drawing Sheets

STEP ONE: Who are you thinking of giving a GREETS to?

What is this person's first name?

there is no need to be formal. Nicknames work too.

What is this person's persuasion?
○ Man  ○ Boy  ○ Girl  ○ Woman

And when is this person's birthday?
[month ▷]  [day ▷]

OK! Let's create a Greets...

This information is used exclusively for organizing the next couple of steps in this process. It won't be sold or shown to anyone! We promise!

PERSONALIZED GREETING CARD WITH ELECTRONIC STORAGE MEDIA AND METHOD OF PERSONALIZING SAME

CROSS-REFERENCE TO RELATED APPLICATIONS

This application hereby claims priority on U.S. Provisional Application Serial No. 60/098,570 filed Aug. 31, 1998, the disclosure of which is hereby incorporated by reference in its entirety.

This application is related to allowed U.S. application Ser. No. 08/988,063 filed Dec. 10, 1997 (now U.S. Pat. No. 5,954,194), the disclosure of which is hereby incorporated by reference in its entirety.

BACKGROUND OF THE INVENTION

The present invention relates to the field of gifts and cards, and, more particularly, to an improved greeting card, such as a birthday card, mother's day card, or the like, having an electronic information storage media, such as a compact disk (CD), contained therein, and to a method of enabling the purchaser of the card to personalize the card for the intended recipient for whom the card was purchased. The card may optionally also include a gemstone gift, or other item of value or perceived value, contained therein in a secure and, preferably, visible manner along with the CD or other storage media.

In the past, numerous cards, such a greeting or special occasion cards, have been available in a variety of shapes and sizes and with a variety of different decorative images, indicia and/or messages thereon. Such cards are often purchased along with a separate gift item to be presented to the recipient of the gift as a complement to the gift. A variety of cards have also been made which are designed to hold a toy, novelty or gift item, such as a piece of candy or a dog biscuit, as evidenced by U.S Pat. Nos. 4,152,865 and 4,203,516. Cards have also been constructed in the past in a manner which enables an audio cassette to be contained therein, as evidenced by U.S. Pat. No. 4,433,780.

Prior art cards, however, have not heretofore provided a card configuration which can be easily customized by the purchaser in a manner other than simply by writing with a pen on a portion of the card. Prior art cards also have failed to provide interesting and/or entertaining information tailored specifically to the person to whom the card has been purchased for.

Thus, a need exists for an improved card and method of personalizing same which overcomes the disadvantages of the prior art.

SUMMARY OF THE INVENTION

Thus, a primary object of the present invention is to provide an improved card/gift and a method of producing same.

A more particular object of the present invention is to provide a customizable gift which can easily and efficiently be customized by a first person for a second person.

Another object of the present invention is to provide a method which enables customized gifts to be produced which includes a customized visual and/or audio presentation.

Yet another object of the present invention is to provide a method which enables an electronic customized gift to be produced which contains information on certain gifts selected from a plurality of possible gifts.

A further object of the instant invention is to provide a customizable gift which can be easily customized for a variety of different people having different tastes and interests.

Another object of the present invention is to provide a customizable gift which can be easily adapted to a variety of different occasions.

Still another object of the instant invention is to provide a customizable gift and method of producing same which takes advantage of the Internet.

These and other objects and advantages are achieved by the instant invention which provides a method and system for enabling a first person to produce a customized gift for a second person, including: providing a computer-readable storage medium having a control program and non-customized information stored thereon; obtaining data from the first person which relates to the second person; using the data to generate a customization code; providing the gift and the customization code to the second person; causing the control program to request the customization code from the second person; and using the customization code to select information from the non-customized information to provide a customized display to the second person. The gift is preferably purchased and customized through an Internet website or other electronic system.

In accordance with another aspect of the invention, a customized gift is provided which includes a computer readable storage medium containing a control program and non-customized information, and a customization code. The control program is operable in response to input of the customization code to provide a customized display using information from the non-customized information selected based on the customization code.

In accordance with another aspect of the invention, a method is provided for enabling a first person to produce a customized gift for a second person, including: providing a computer-readable storage medium having a control program and non-customized information stored thereon; obtaining data from said first person which relates to the second person; using the data to generate a customization code; storing the customization code in a database together with a unique identifier for the gift; and providing the gift to the second person. The control program is operable to access the database and obtain the customization code based on the unique identifier, and use the customization code to select information from the non-customized information to provide a customized display to the second person.

BRIEF DESCRIPTION OF THE DRAWINGS

Other objects, features and advantages of the subject invention will become apparent from a study of the following specification when viewed in light of the accompanying drawings, in which.

DESCRIPTION OF THE PREFERRED EMBODIMENTS

The instant invention provides a gift card, as well as a method and system for enabling the purchaser of the gift card to personalize the gift card for the desired recipient thereof. The following description will describe preferred embodiments of the gift card itself, as well and the method and system for enabling personalization of the gift card. While particular embodiments of the invention are provided below, the description thereof is not meant to limit the scope of the invention, but is instead to be considered as non-limiting examples of the invention.

Prior to describing details regarding the customization features of the present invention, the gift card itself will be described below. It is noted that a suitable gift card for use in connection with the instant invention is described in allowed U.S. application Ser. No. 08/988,063 filed Dec. 10, 1997 (now U.S. Pat. No. 5,954,194), by the instant inventor.

Figure 1:
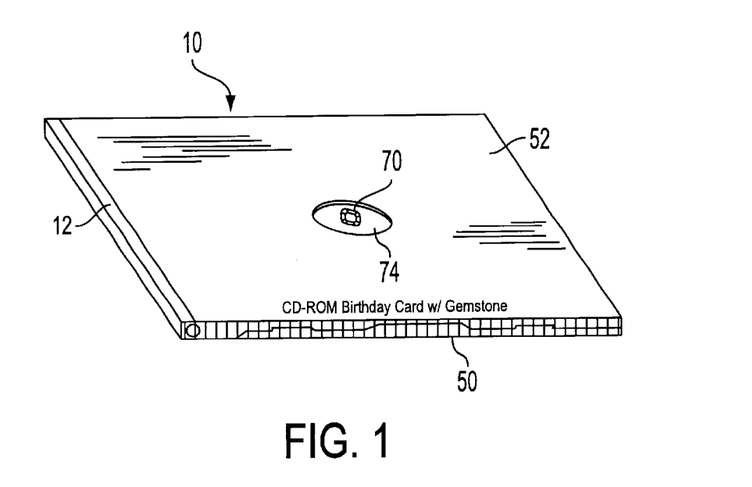
FIG. 1 shows a preferred embodiment of the greeting card device of the present invention.
Figure 2:
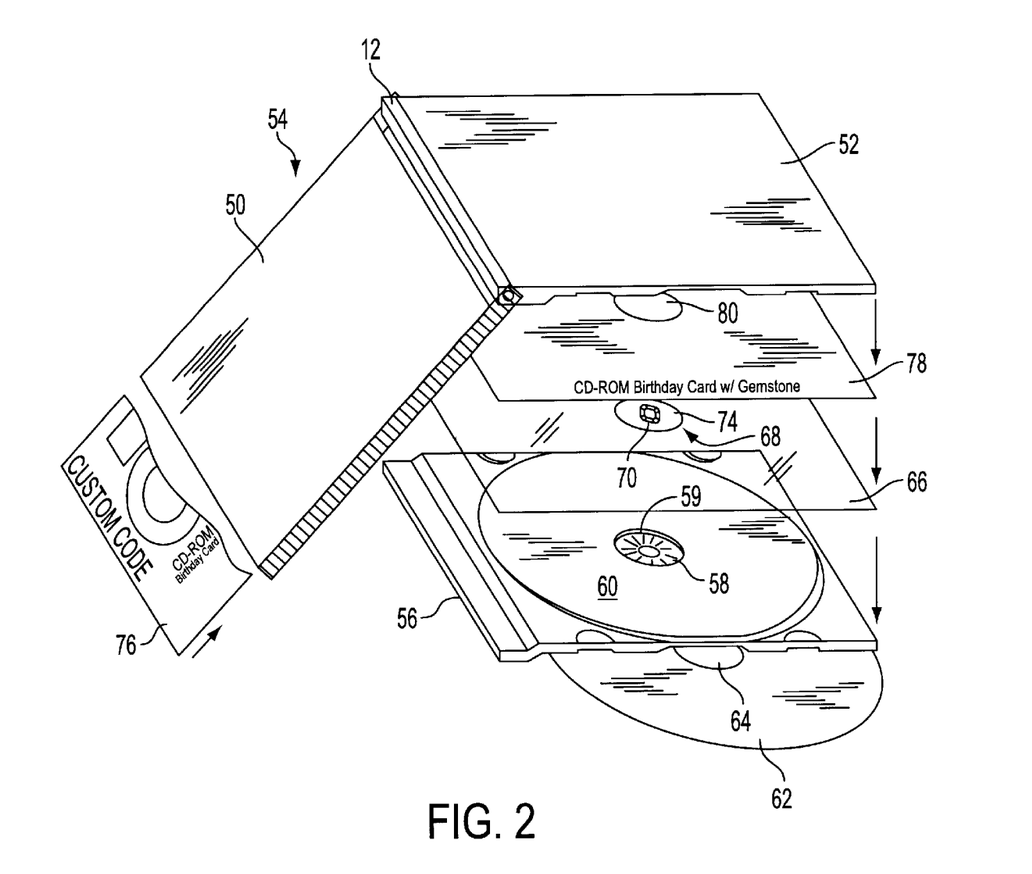
FIG. 2 shows an exploded view of the embodiment of the instant invention shown in FIG. 1.

An exemplary embodiment of the instant gift card or card device 10 is shown in FIGS. 1 and 2. This embodiment is particularly adapted for incorporating a compact disk (CD) 62 or other similarly shaped storage medium, in the card. The compact disk may be a CD ROM, recordable CD, a digital video disk (DVD), or any other suitable type of computer readable storage medium. This embodiment includes a front card portion 50 and a back card portion 52 which are hinged together in a manner which enables the card 10 to be opened and closed. Preferably, the front and back card portions constitute a conventional compact disk case 54, sometimes known and a "jewel case" or "CD box". However, any other suitably designed case 54 can be used. The case 54 has an interior space when closed. Inside the case 54 is a compact disk carrier 56 mounted within the card interior and having a central raised portion 58 on a front side thereof. The raised portion on the front side defines an open recess 59 on the back side 60 of the disk carrier 56.

The card 10 further includes a compact disk 62 positioned on the front side of the compact disk carrier 56, such that the central hole 64 on the compact disk receives the raised portion 58 on the front side of the disk carrier 56. In accordance with a preferred embodiment of the invention, the card 10 may further include a gift item carrier device 66 including a gift carrier portion 68 containing a gift item 70, such as a gemstone or birthstone. The gift carrier device 66 preferably includes a transparent window 74 behind which the gemstone 70 is mounted with a suitable backing device or layer. The gift carrier device 66 has a size and shape which enables it and the compact disk carrier 56 to be positioned in nested relation within the interior space of the card 10. More particularly, the gift carrier portion 68 is received within the open recess 59 in the back side 60 of the compact disk carrier 56.

Preferably, the card case 54 is made of transparent material, and the card additionally includes a piece of sheet material 76 and 78, such as paper or card stock, inserted on the inside of the front card portion 50 and the inside of the back card portion 52, such that the sheets can be seen through the transparent case 54. The sheet 78 inside the back card portion 52 preferably contains a hole 80 therein for enabling the gemstone 70 or other gift item to be seen therethrough. The sheet material 76 can include printed information or decorative indicia, so as to transform the card device into a special occasion card, such as a birthday card or the like. The sheet 78 and gift item carrier 66 may alternatively be constructed as a single element.

In accordance with the instant invention, the CD 62 preferably contains interesting and/or fun information which relates to birthdays, the gift item, or any other type of suitable information. For example, if the gift item is a gemstone, the information on the CD may provide specific information about the gemstone. In a more specific embodiment, the card is a birthday card and the gift is a birthstone. A set of twelve such cards can be made each being tailored to one of the twelve months of the year and containing a specific birthstone for each month, respectively. Each card can be color coordinated to the color of the birthstone and may include a detailed photograph or drawing of the birthstone on the front cover 12a thereof. Information and decorative indicia may also be printed in any suitable location on the card. For example, the card could include a picture of a birthflower corresponding to the birthstone, information on an interesting event occurring in that month or an interesting person born in that month, and/or information on the stone itself, including famous examples of the stone, hardness, care and cleaning instructions, or any other desired information. The card may also include a portion for enabling the purchaser to provide a personalized written message on the card. The CD 62 may include even more detailed information relating to the gemstone or whatever gift item is contained in the card. The recipient of the card 10 can remove the CD and the gift item carrier and have the option of removing the stone and using it in a piece of jewelry.

In addition to, or alternatively to, providing a gift item in the recess 59 on the back of the CD carrier 60, one of more gift items, such as gemstones or any other suitable gift item, may be provided in the spline portion 12 of the CD case 54. The spline potion 12 of the CD case 54, which provides a conventionally empty space can, in accordance with the instant invention, be used for holding such gift items having a size and shape which enable insertion therein.

It is note that the card device 10 of the instant invention is not limited to an embodiment wherein a gift item is provided with the card device 10. In fact, the card device 10 may simply include the electronic storage medium or CD 62, as will be described in detail below, without any of the other features described herein. Preferably, however, the card device at least includes a carrier for holding and protecting the CD 62.

Various preferred embodiment of the system and method of purchasing, personalizing and viewing the personalized card device 10, as well as other related functions provided by the instant invention, will now be described with reference to FIGS. 3–9. The first embodiment described corresponds closely to that which is described in U.S. Provisional Patent Application No. 60/098,570 filed Aug. 31, 1998, by the instant inventor. The later embodiments represent variations on this embodiment and provide alternative methods and systems in accordance with the instant invention.

In accordance with the first embodiment of the invention, the CD greeting card 10 may be purchased on-line by the purchaser, by, for example, a specialized Internet website or other similar type of on-line service, i.e. an e-commerce site specifically designed to handle the card purchasing transaction, as explained in detail below. The purchaser chooses the particular card he wants from, for example a "Virtual Display Rack" on the website, which shows the various cards that are available, and then "clicks" on a "Buy" button. The available cards may be birthday cards, mother's day cards, or any other cards that a person may want to give someone for a special occasion or as simply a gift. At that point, the purchaser can option to pay for the selected card with a credit card on-line or dial a phone number to pay over the phone. Once the purchase is approved, a "Record Personal Message" button and option appears on the web page. At this point, if the purchaser desires to provide a personalized message for the cards recipient, he/she may do as explained below.

In order to provide a personalized message, a screen is presented on the web page asking the purchaser for some basic data about the intended recipient of the card. For example, the purchaser may be prompted for the name and birth date (preferably day and month only) of the person to whom the purchaser intends to give the card to as a gift. In addition, the purchaser is then given the option to enter a personal message on the web page for the recipient of the card. The purchaser then "clicks" a "submit button" and the data is saved to a database. The information stored is indexed in the database with a link to a unique piece of information, such as the CD serial number, so that the information entered maintains a connection to the particular CD card purchased to enable retrieval at a later time by that particular CD card.

The CD card can then be sent, via mail or otherwise, to the purchaser so that he/she may give it to the intended recipient, or the card can be sent directly to the intended recipient from the company offering the card and maintaining the website.

When the card's recipient receives the CD card, and puts it into the CD drive on a computer the following things occur automatically. The CD automatically looks to see if the proper software is present on the computer to run it correctly. If not, the CD will respond, for example, "Your computer doesn't have Quick-Time which is required to view your CD, would you like to install it now?" and an "Install Now" button is presented. After that, the CD looks for a telephone line, a modem and Internet software on the computer, and if additional software is required it will give the recipient another button option to install that as well. The CD then automatically causes the computer to access the website at which the card was originally purchased, or a related web-site.

Once at the web site, the CD retrieves the awaiting message left by the purchaser from the database for that particular CD and automatically displays it on the recipient's computer monitor. The personalized message may be, for example, "Happy Birthday Matt", "Congratulations . . . dinner is on me!", or any other personalized message that the purchaser wants and has entered. The message could also be a video, MP3, Audio book, or any other download selected by the purchaser of the product to be presented to the recipient.

After the personalized message is displayed, a program begins that is stored on the CD provided with the card. Preferably, the program uses the data entered by the purchaser of the card to select the type of information which will be displayed to the recipient on the computer. For example, if the card is a birthday card and the purchaser has entered the birth date of the recipient, the program on the CD uses that birth date information to determine what information available on the CD to display to that particular recipient. For example, if the recipient is born in September, the program preferably selects information relating to that month. Any other suitable data can be entered and selection criteria can be used to personalize the card for the recipient.

In other words, the CD preferably includes large amounts of information that, for example, relates to each month of the year or to many possible recipients, and the information provided by the purchaser enables the program to determine what information to display to that particular recipient, thereby enabling the cards to be personalized by the purchaser for the recipient, without the need for customizing the information stored on each CD sold with a card. This feature enables all of the CDs to contain the same information, but still allow each card to be customized by the purchaser for a particular intended recipient. In other words, the customization feature of the invention is used to "unlock" a particular subset of the total amount of information contained in the CD, thereby personalizing the CD for the recipient, without the need to actually produce a custom CD.

The program preferably provides the user with an interesting and/or entertaining video and/or audio presentation on the recipient's computer based on the unlocked information contained in the CD. It may, for example, provide information on birth flowers, birth stones, famous people having birthdays during that particular month, famous events occurring during that month, and/or any other suitable information. In one embodiment, the CD 62 contains odd facts, obscure trivia and fun information about, for example, a particular birthstone, birth flower, etc., such as where it comes from, why it may be unusual, and/or any other similar, related or other type of information that is desirable.

In accordance with an alternative embodiment of the instant invention, the card device 10 may be purchased by the purchaser at a retail store rather than by the on-line method described above. If the card is purchased in this manner, the sequence of personalization is slightly different as explained below. More particularly, after purchasing the card device 10 at the retail outlet or other store, the purchaser uses any computer and goes on-line to the website described above. The user is then requested to enter the "Product Code" (CD serial number, for example), thereby allowing access to a secure data entry area. The first time a "product code" is entered, the web-page automatically prompts the user to "Enter personal greeting data". This data is basically the same as that described above, i.e. name, birth date and personalized message. This information is stored in a database as described above, and the purchaser can then give the card to its intended recipient.

Once the user receives that card and puts the CD in their computer, the CD automatically retrieves that information from the database and displays the personal greeting left by the purchaser on the recipient's monitor. In addition to personalized audio messages, personalized video messages may also be stored by the purchaser for later retrieval by the recipient of the card. The message may be entered as a "natural voice" which is then stored as a text/voice file, and is subsequently played back to the recipient in the purchaser's actual recorded voice when the recipient puts the CD in a computer. This natural voice feature can be used by the purchaser if the purchaser has a microphone during the on-line purchasing process. This feature can also be made available via a cell phone, or telephone customization process via a 1 900 line or the like. In other words, the information of the CD preferably provides an interesting, educational and/or exciting multi-media display for the recipient of the card.

Another customizable feature that can be used in accordance with the present invention, is that when the purchaser is customizing the CD on-line, he/she may add custom "gifting" to be included with the card to be presented to the recipient. This feature is driven by a "Giftbox" selection process available on the website. The gifting process enables the purchaser to select at least some of a plurality of available gifts, such as free or discounted items, that the purchaser believes the recipient may enjoy receiving. The actual physical gifts selected are not included with the CD. Instead, coupons or vouchers for the gifts, which can later be used by the recipient to obtain the actual gift, are provided on the CD and can, for example, be printed therefrom when the recipient is viewing the CD presentation. The gifts may be any suitable type of gift that can be initially presented to the recipient, such free or discounted goods or services like communication services (cell phones, wireless and long distance telephone service), Internet access, software, flowers, movie videos or tickets, clothing and fashion products, cologne/perfumes, dining and small vacation packages, or the like. The content of the CD may provide an infomercial-type presentation relating to the selected gifts, and then provide the user with information on how to obtain the gift, such as by printing a coupon good for movie tickets and/or other gift items. The CD may also provide hotlink functionality to enable the user to access websites associated with the available gifts to, for example, learn more information about the gift or related products and services.

The above-described embodiments of the instant invention require that the purchased CD 62 be operable to automatically (or through instructions provided to the recipient) access the website to retrieve the personal message left by the purchaser of the card device. In accordance with these embodiments of the invention, the CD may contain a default program or autogreeting feature that will run if, for some reason, the website cannot be accessed. This default program may be operable to query the user for enough information to provide some level of customization for the recipient of the card, i.e. the program could ask for the date of birth information and then unlock certain CD information to provide a base level customized display presentation to the user.

However, in accordance with another embodiment of the invention, this base level customization used during Internet failure can be improved in the following manner. When the purchaser goes through the customization process described above, thus creating a unique "file" which is stored in the database by a host machine operating the website for later retrieval by the CD when used by the recipient, the file information is also coded as a "product Code" which is printed on the CD packaging at the fulfillment house which supplies the CD as it is prepared for shipping to the recipient. That product code can then, in case of an Internet failure, be asked for by the program on the CD upon execution thereof. When the code is entered by the recipient, it operates to unlock the same multi-media presentation that the purchaser intended without accessing the website. In this manner, a customized presentation can still be presented to the recipient as intended by the purchaser without Internet access. The only missing information would be the personal message left by the purchaser at the website, which cannot be accessed until the Internet failure is corrected.

Another embodiment of the instant invention will hereafter be described with particular reference to FIGS. 5–9, wherein the CD is not intended to automatically access the Internet website upon use by the recipient to obtain the personal message. Further details regarding customization of the CD card 62 are also described, which details can apply to any of the embodiments disclosed herein.

Figure 5:
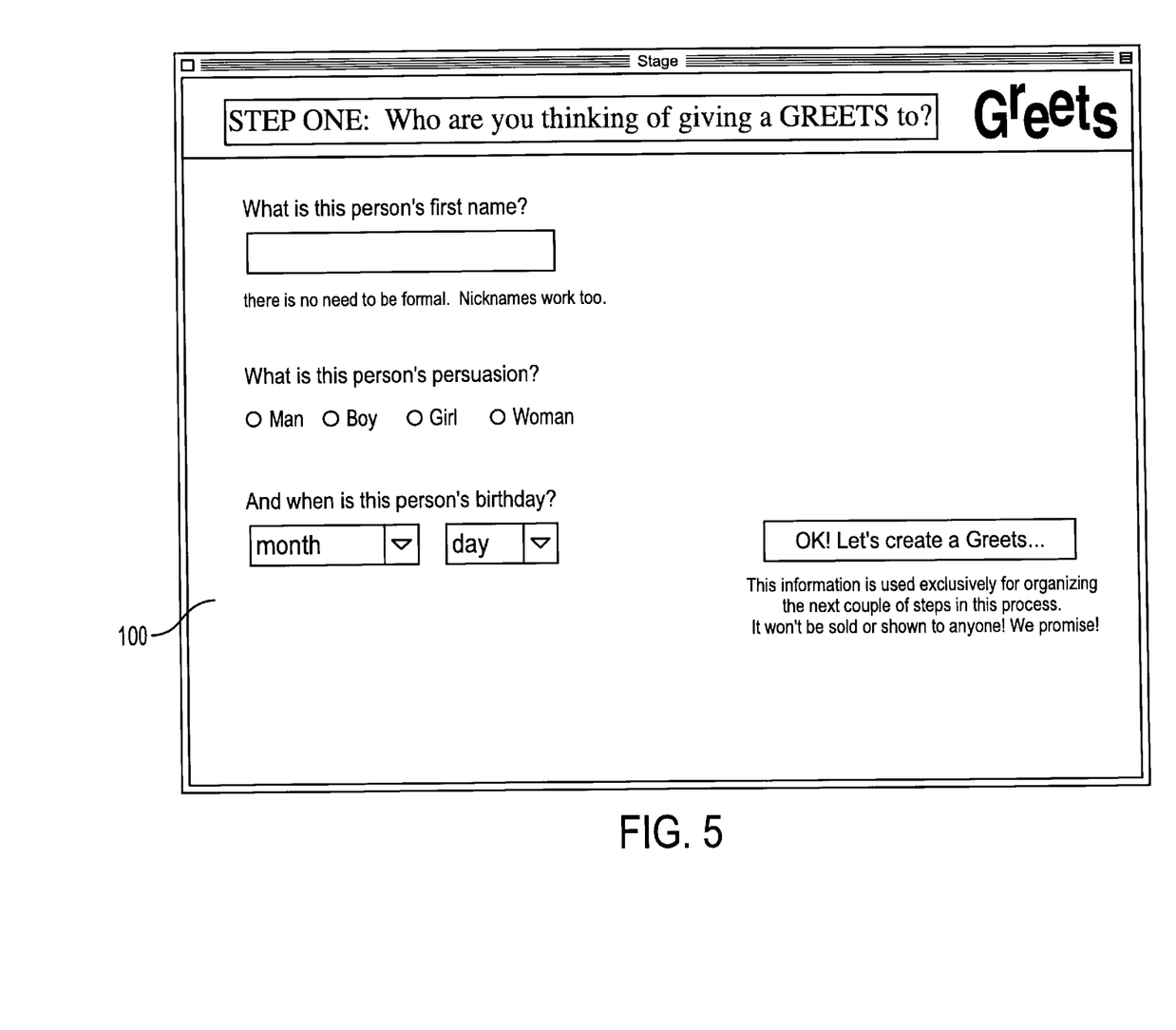
FIG. 5 shows an exemplary display screen used in accordance with a first step of a preferred embodiment of the method of the instant invention.
Figure 6:
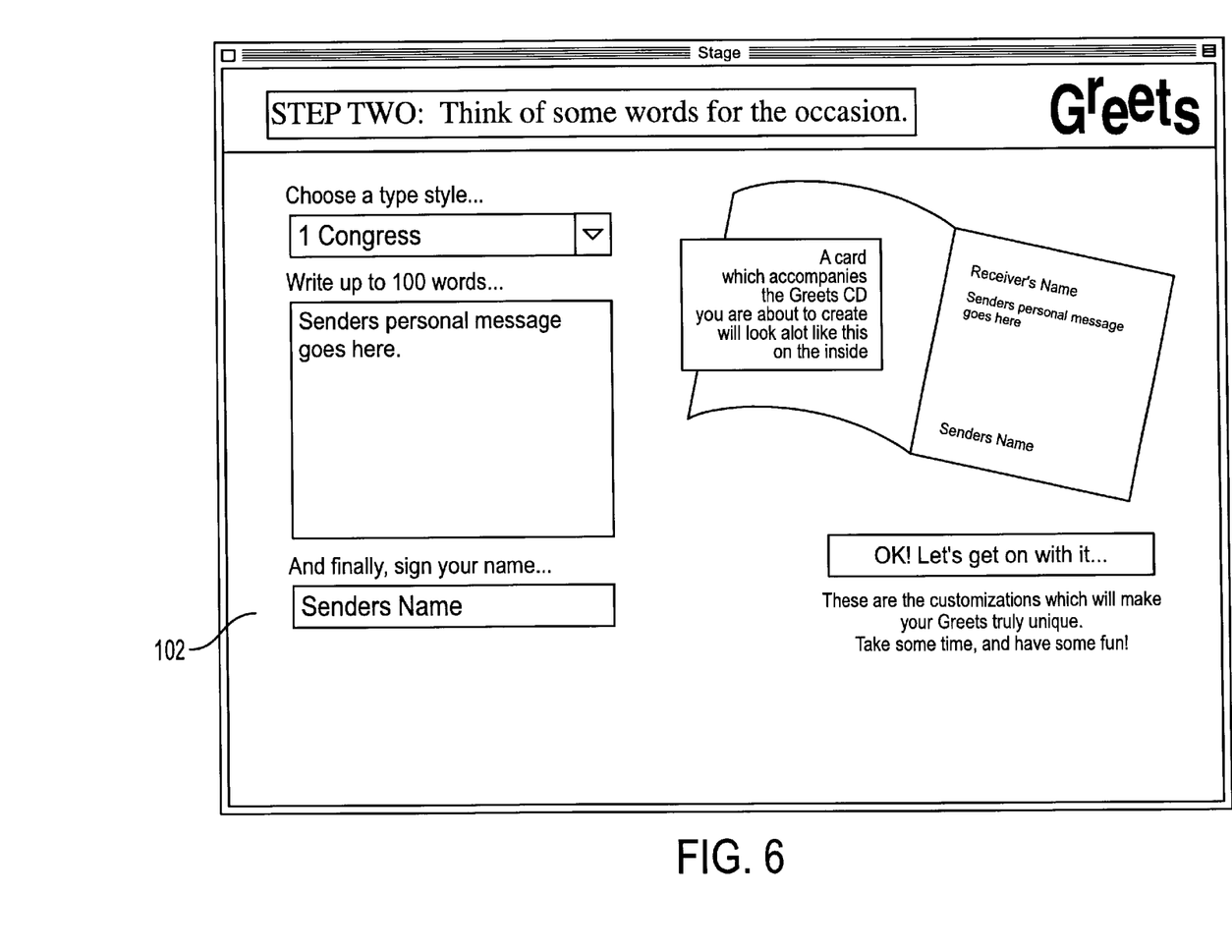
FIG. 6 shows an exemplary display screen used in accordance with a second step of a preferred embodiment of the method of the instant invention.
Figure 7:
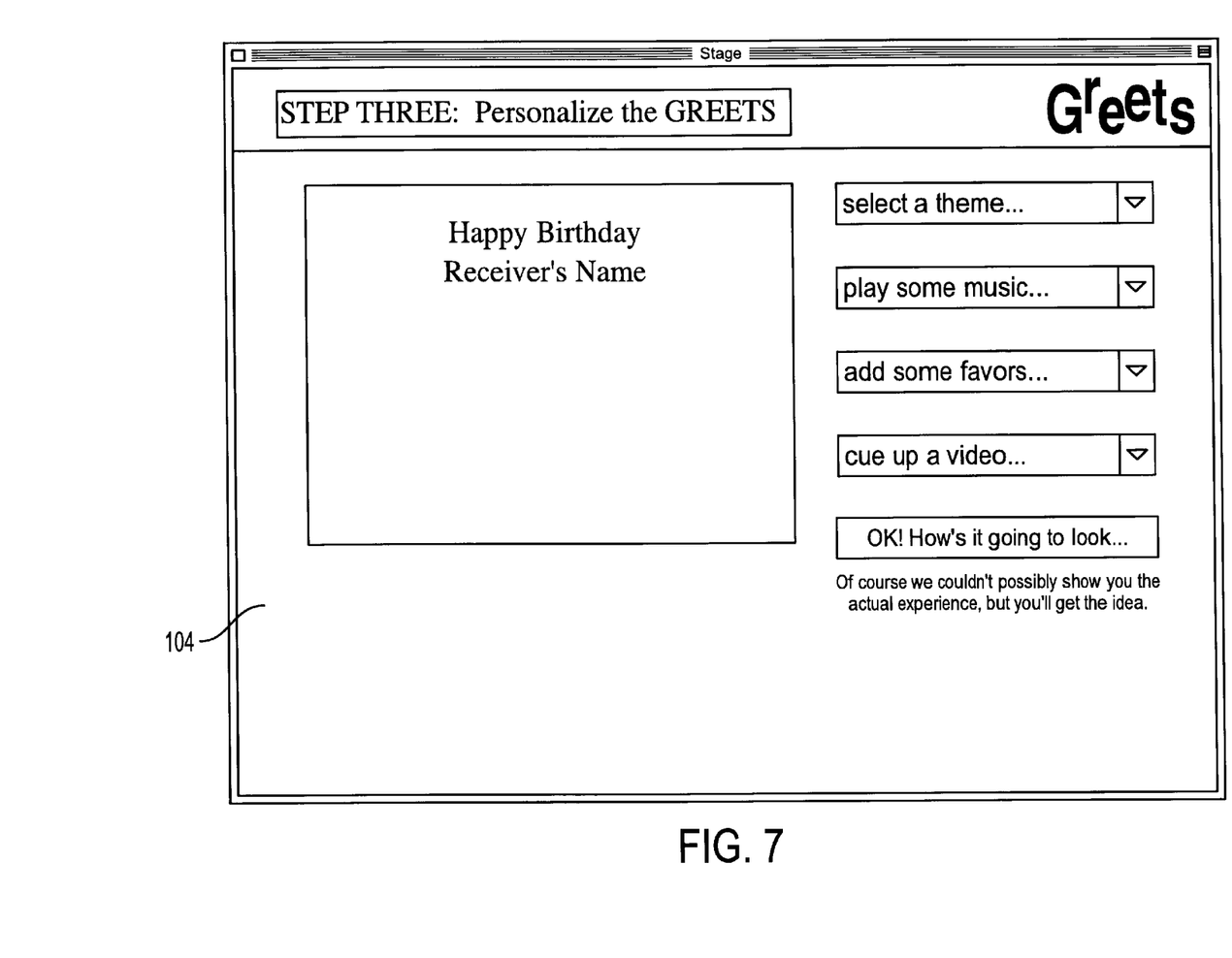
FIG. 7 shows an exemplary display screen used in accordance with a third step of a preferred embodiment of the method of the instant invention.
Figure 8:
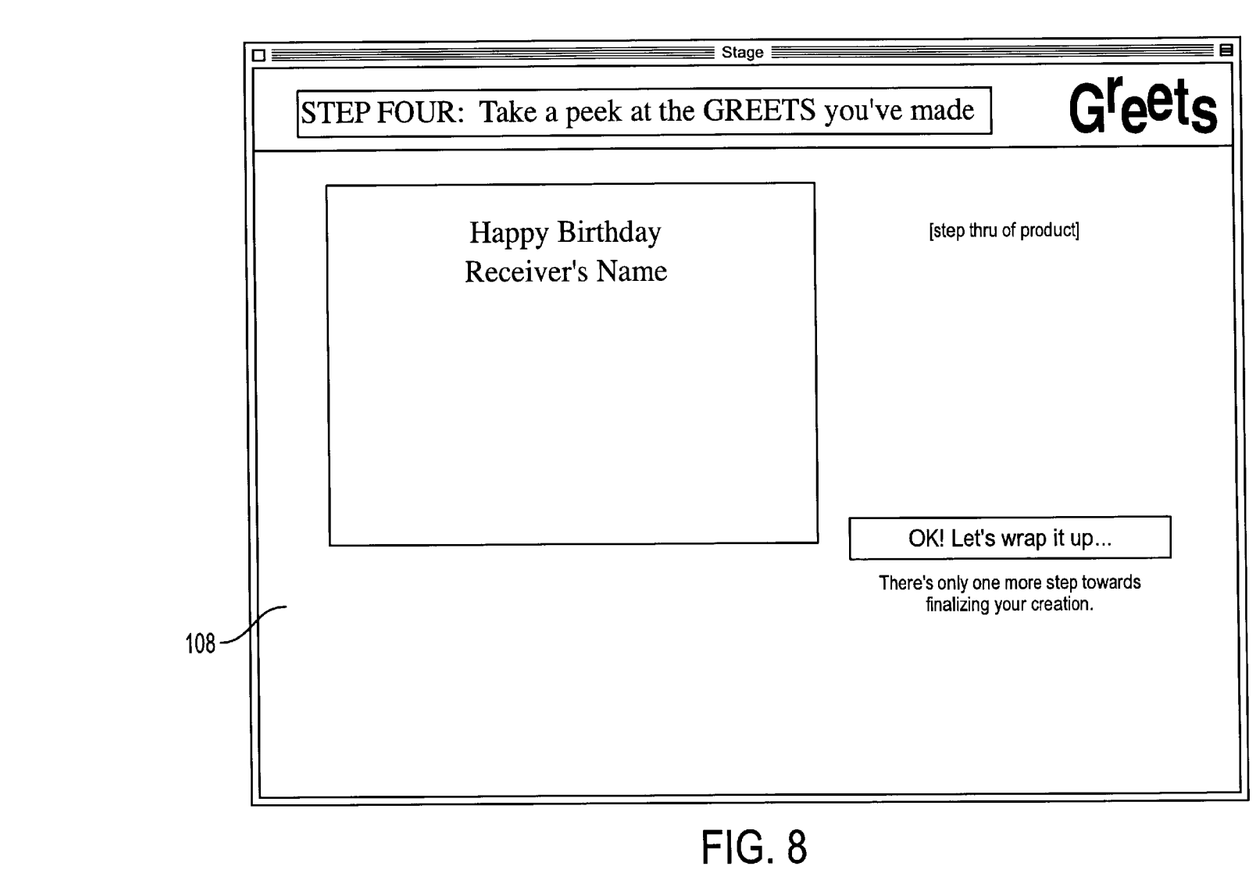
FIG. 8 shows an exemplary display screen used in accordance with a fourth step of a preferred embodiment of the method of the instant invention.

In accordance with this alternative embodiment, the CD 62 is a product that can be purchased from a specialized e-commerce website. During the process of purchasing the CD, the purchaser is given the opportunity to customize the CD for the recipient in several ways, as will be explained in greater detail below. When visiting the website, the sender is first asked to provide some basic information about the person to whom they desire to send the gift card 10, i.e. the gender, name and birthday of the intended recipient. Based on this information, a back-end database driven architecture provides the sender with a set of default starting "assets" for the CD card, which may include particular animations, background scenes, colors, sound, etc., generally considered to be appropriate for the recipient based on the information entered. An exemplary input display 100 is shown in FIG. 5 for entry of this information. The purchaser is then given the opportunity to deviate from the default settings to further customize the card. The choices that the user makes in this editing phase is preferably later used, as explained below, as part of the "Product Code." In addition the sender is given the opportunity to write a personal message that is printed on the card stock or card accompanying the CD gift card 10. A sample exemplary input display screen 102 for entry of the personal message and 104 for further customizing the CD are shown in FIGS. 6 and 7, respectively. The sender is also given the opportunity to select the type of gift wrapping for the CD gift card 10, as shown in the exemplary display of FIG. 10. The exemplary display 108 shown in FIG. 8 gives the purchaser the opportunity to view the customized selections made for the card. Once the purchaser has completed the customization process, the back-end system runs a Java servlet that builds the "Product Code", as explained in more detail below. This product code and the personal message are printed on a greeting card that accompanies the CD 62. During playback of the CD 62 for the recipient, the recipient is prompted to enter the product code which is operable, in conjunction with a control program on the CD card to unlock the appropriate assets on the CD for presentation to the recipient. Additional details of the above steps will now be described in greater detail.

Figure 9:
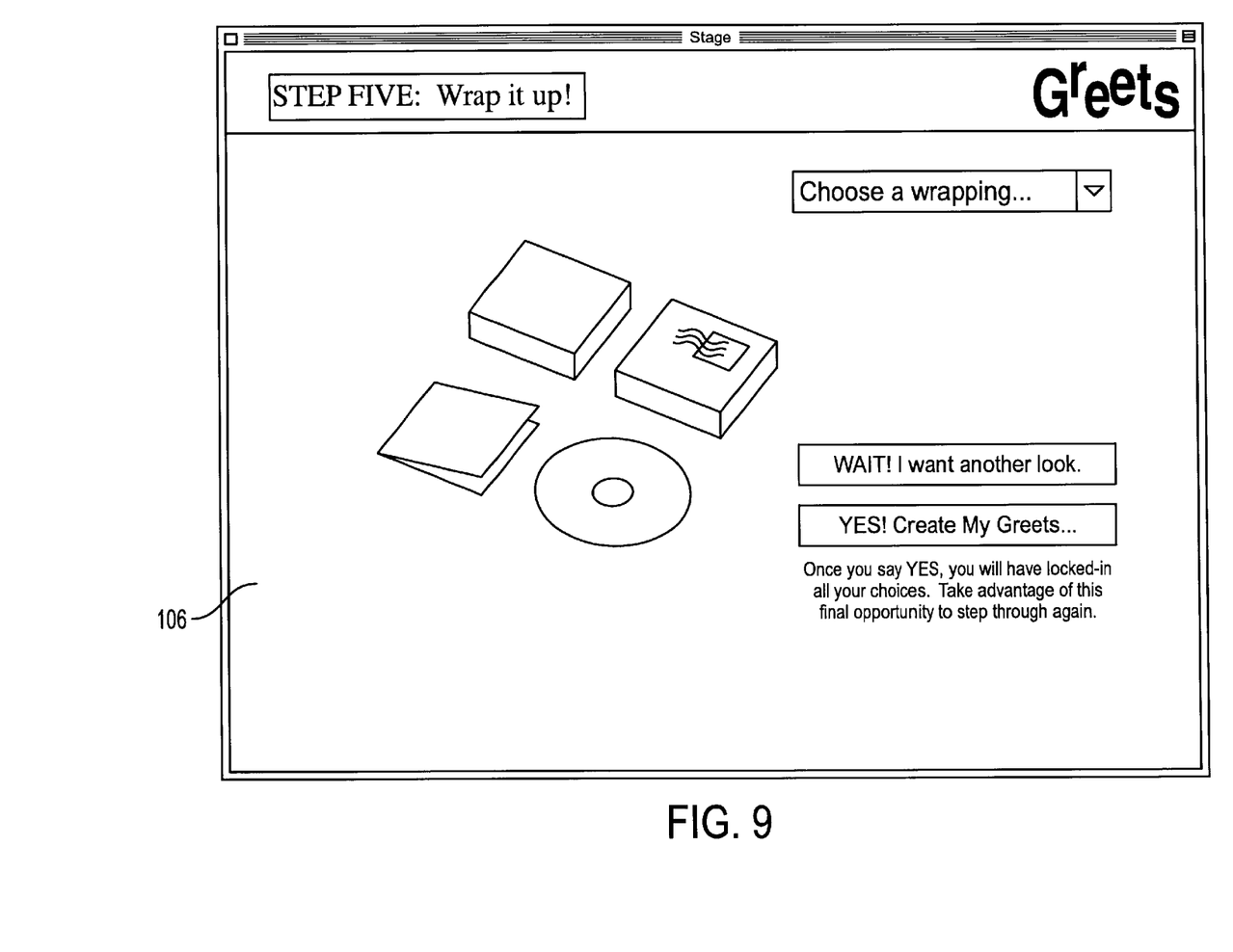
FIG. 9 shows an exemplary display screen used in accordance with a fifth step of a preferred embodiment of the method of the instant invention.

As indicated above, the process of customizing a CD card 10 in accordance with the present invention is preferably competed on-line at a dedicated website. This customization is preferably completed using Macromedia Flash 4.0, along with a back-end website architecture providing the functionality described herein. The customization may alternatively be completed using an automated/voice telephone capturing system. The preferred process of customization includes the following five main steps: providing basic demographics about the recipient (FIG. 5); writing a personal message (FIG. 6); setting product specific attributes (FIG. 7); reviewing current selections(FIG. 8); and selecting a wrap/box (FIG. 9). Each of the steps will now be explained in further detail below.

Upon entering a "Create a CD" section of the website, the purchaser is first asked to provide basic information about the intended recipient, as shown in FIG. 5. Some examples of this information are receiver's gender, first and/or last name, birth day, birth month and/or the like. These basic questions may be modified depending on the type of occasion that the card is designed to be used for, such as Valentine's Day. Based on the purchaser's answers to these questions, the database pulls out a default set of assets that are generally considered appropriate for the recipient. For example, a 22 year old female's default may include satin backgrounds and flower animations, while a 9 year old boy's default may include a space ship background and balloon animations. In accordance with the invention, the defaults may be real-time defaults based on actual purchasers made for a given demographic using a database driven system.

The second step of the customization process involves writing a personal message that will be printed on a greeting card that accompanies the CD 62, as shown in FIG. 6. The personal message can preferably be up to 100 words or 500 characters long, but any suitable message size may be used. In addition, the user may also choose the type style or font for the card. This type style will be incorporated into the product code, and thus be operable to change the appearance of certain assets during the CD presentation. The personal message and the type style are transmitted to the product fulfillment house to be printed on the greeting card accompanying the CD.

The next step in the customization process involves editing the appearance and assets to be selected by the CD for presentation to the recipient, as shown in FIG. 7. When the purchaser enters the editing process, he/she is presented with a default set of assets based on the information that was previously entered. From these default assets, the sender may change the preferences by using, for example, available pull-down menus and/or buttons as shown on FIG. 7. As the sender makes new selections, he/she can see a real-time update of the current selections on the display. This allows the sender to quickly and easily see how the choices are effecting the CD card. Once the sender has determined which assets are appropriate, the choices are saved and later become part of the product code.

The next step in the process enables the purchaser to review all choices previously made, as shown in FIG. 8. In addition, the purchaser will have the opportunity to view a limited preview of the content of the CD presentation. Due to the limited bandwidth of the Internet, this feature preferably only includes a limited version of the content of the full CD presentation that will eventually be displayed to the recipient.

The final step in the customization process involves selecting the gift wrap/box that the CD gift card 10 will be shipped in to the recipient, a shown in FIG. 9. Once the sender has selected the appropriate gift wrap/box, all of the custom selections are passed out of the Flash movie to the back-end Java system for processing.

As indicated, once the sender has completed the "Create a CD" section of the website, the Flash movie calls a Java servlet action entitled, for example, "AddGiftSet". This action takes the choices made by the purchaser during the editing session and translates those choices into the first half of the product code. The second half of the product code is a database pointer that ties the current order to the custom choices made by the sender. Eventually, this product code is what determines which assets are shown to the recipient by the CD gift.

Once the order is confirmed, the product code is transferred to the fulfillment or distribution house, via the Internet or in any other suitable manner. Once the fulfillment house receives the order, the product code along with the personal message are printed on the appropriate greeting card. The greeting card, including the CD 62, are then placed in the selected gift wrap/box. The product is then placed in a mailing liner and sent to the appropriate shipping address, which is also obtained by the website during the purchasing process.

When the recipient of the CD gift card 10 puts the CD 62 in his/her computer and runs the control program that is contained on the CD, he/she is prompted to enter the product code, which may be referred to as the "Party ID" which is printed on the product. As explained above, part of this product code informs the program on the CD of the selected subset of assets which are to be unlocked from the total assets contained on the CD for presentation to the recipient. The remainder of the product code preferably is used to identify the exact CD to the back-end Internet system. Preferably, upon entering the product code, the CD application runs the code through a check-digit to determine if the code is valid. If the code is valid, the application then runs the code through a series of resource look-up tables to assign values to the necessary variables to, for example, set the background, the music or sound, and any other attributes which have been selected to enable the customized multimedia presentation to be displayed to the recipient. The second half of the product code is used when the receiver of the CD clicks a link to the product website that the CD was purchased from. This link sends the product code to the website which can then be used by the company offering the product and maintaining the website to verify that the recipient has received and used the CD gift.

As explained above, the Internet provides a unique and efficient way to customize and personalize on a real-time basis the specific content on the CD which will be displayed to the recipient of the gift. The dense multi-media content preloaded on the CD provides audio-visual graphics that cannot economically or efficiently be delivered over the Internet because of bandwidth requirements. For example, a sequence of full color images combined with stereo quality audio track takes approximately 1.5 minutes to view using the CD, while the same content delivered over the Internet, even with a 56 kb connection, could take several hours to download and view.

Figure 3:
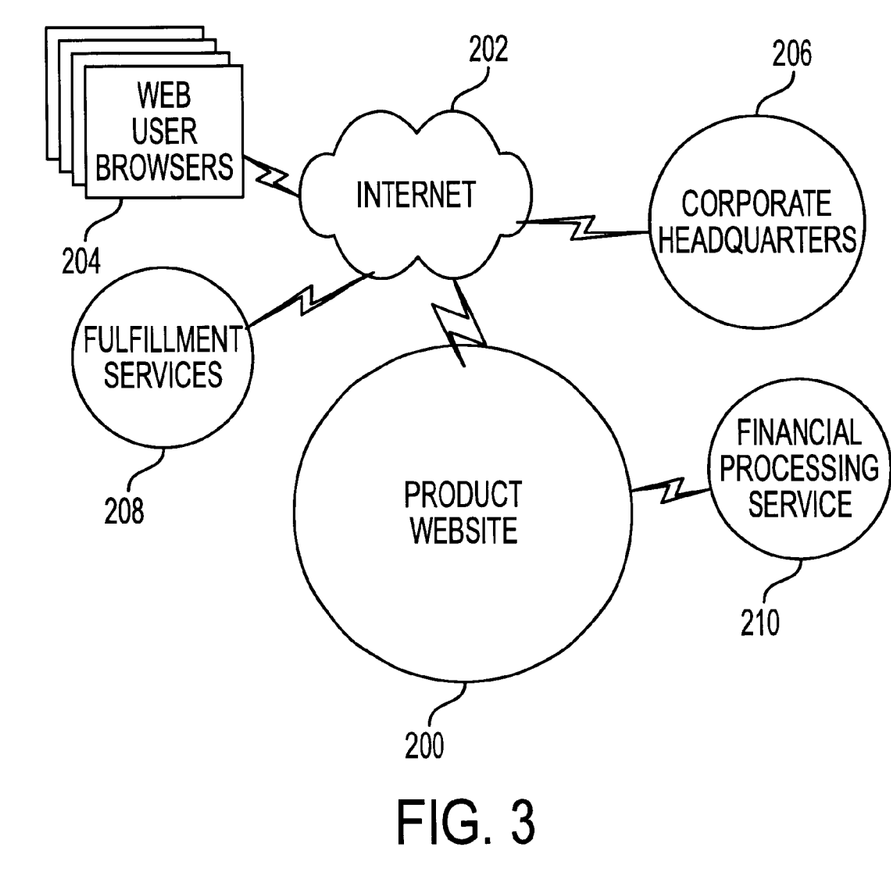
FIG. 3 schematically illustrates a preferred embodiment of the major system interfaces that are used in accordance with the instant invention to order, customize and deliver the card device of the instant invention.
Figure 4:
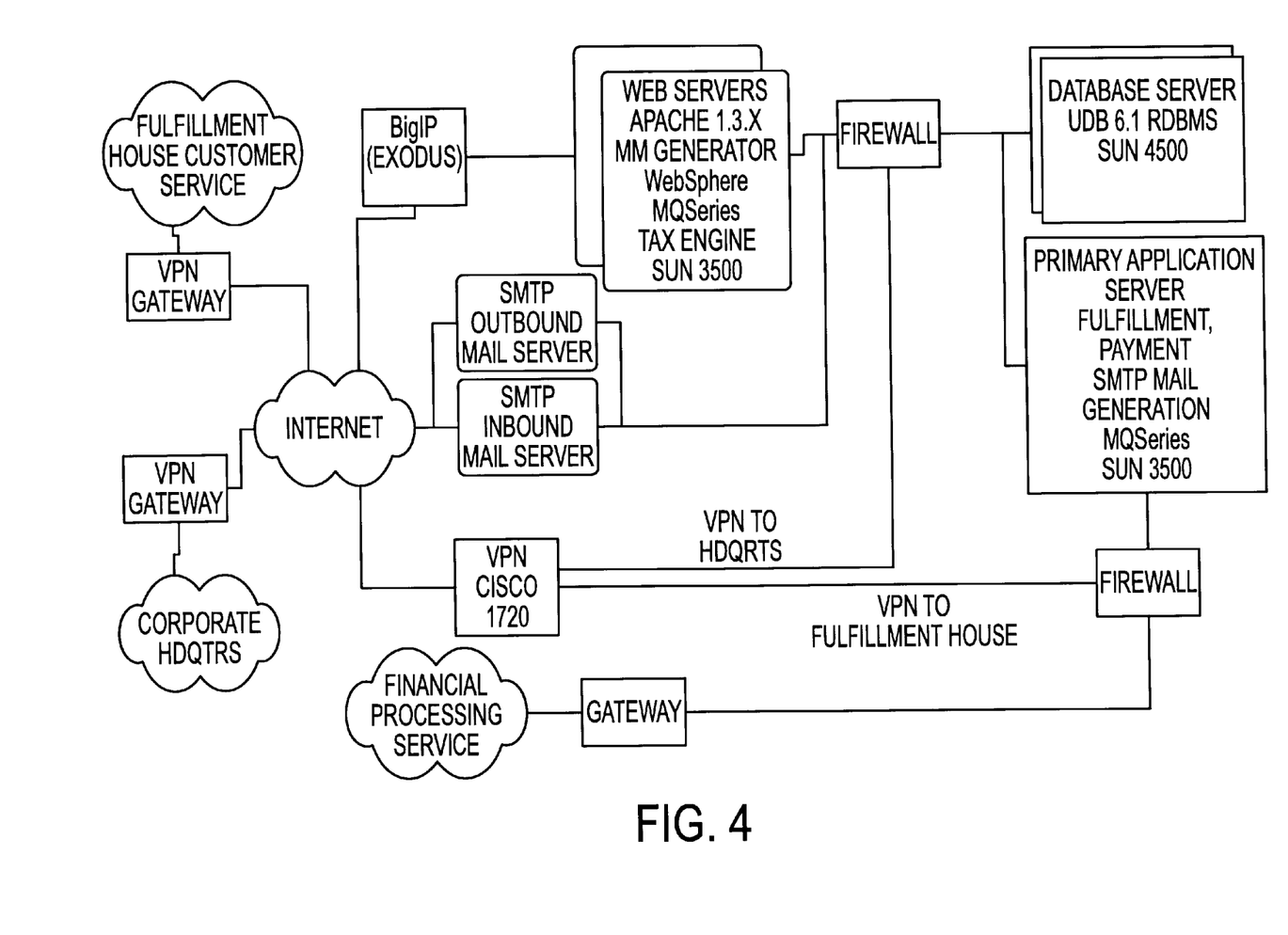
FIG. 4 schematically illustrates a preferred embodiment of the website architecture used in accordance with the instant invention.

Referring now more particularly to FIG. 3, there is shown a general overview of the main system component and interfaces used in accordance with a preferred embodiment of the instant invention, which includes the product website 200, product fulfillment warehouse and services 208, financial processing services 210, web user browsers 204 and corporate headquarters 206, all of which preferably interact over the Internet 202. The major set of functional requirements used in accordance with the invention are gift composition, existing user management, gift order, site operation management, inventory management and customer support. The website 200 is preferably designed as a high-performance, high availability Internet system with redundant subsystems and transparent fail-over. The website can be mirrored for additional load balancing and availability. As shown in FIG. 4, the primary website components include a load balancing server, web server, application servers, database servers, firewall, virtual private network (VPN) gateways, financial processing service central gateway, and SMTP mail services. The load balancing server works in concert with content web servers and commerce web servers to provide balanced distribution of users across the servers and to provide a transparent fail-over capability. This service is preferably provided by the remote hosting service, Exodus, and is based on BigIP software. The gift composition web servers preferably deliver streaming content using Macromedia Flash format via the Macromedia Generator Application server. The Apache 1.3.x HTTP server and the IBM Websphere servlet engine is preferably used to server the Flash files. Minimal business rules processing is done using these servers. Integration software is preferably implemented using industry standard, platform independent Java (JDK 1.1.X).

With respect to purchasing, the web server supports financial transactions using a Secured Socket Layer (SSL) session to the web user's browser. These servers interact with the Financial Processing Service for payment authorizations. The Application servers provide business rules processing for database processing, fulfillment processing, administration and maintenance processing and tax calculation. They will execute on dedicated back-end hardware. These servers are preferably connected using MQSeries message queue infrastructure. The database servers provide efficient data storage and business rules processing on a Relational Database Management System (RDBMS). These servers preferably execute the IBM Universal database (UDB) DB2 version 5.2/6.1. Firewalls, in the form of an integrated hardware and software device, are used to strengthen the protection for the website from unauthorized access from the public Internet. It provides packet-filtering rules to limit the protocols and connection from the known addresses of the outside web servers and SMTP servers to and from the internal database server. The website is preferably remotely hosted away from the corporate headquarters of the company offering the CD card product and the fulfillment warehouse. Both preferably have real-time connectivity to the website. However, rather than build a private network, the website is preferably designed to use Virtual Private Network (VPN) technologies to securely connect these geographically dispersed sites. VPNs are built with data encryption technology to "tunnel" securely through the public Internet. The VPN link is transparent to the users of the network. The VPN is preferably extended between the website and the fulfillment house data center and carries the following classes of data traffic: 1) Automated, system to system interface (This interface is preferably based on XML 1.0 using suitable e-commerce DTD). This interface will be for product orders, order cancellations and tracking requests; and 2) Web application to system interface. This interface is preferably a forward extension of a set of web browser pages from an application web server located at the website. This facility is used by the fulfillment house data center personnel and customer service representatives. Content will be for product orders, order cancellations, tracking requests and manual transfer for bulk transactions (as a backup to the automated processes). The VPN is also extended to the website and the corporate headquarters and has a similar interface described above. The content thereof is used for system processing, performance, financial and administrative reports. This VPN will be used by the corporate headquarters personnel to manage and monitor the remote website. The financial processing service center gateway provides a real-time interface which connects the Commerce Web Servers with a third party financial processing service. This connection is used for payment authorizations, charges and charge reversals. The SMTP mail interface enables SMTP Mail to be used for order confirmation and shipping notification to web users who purchase product from the website.

Figure 10:
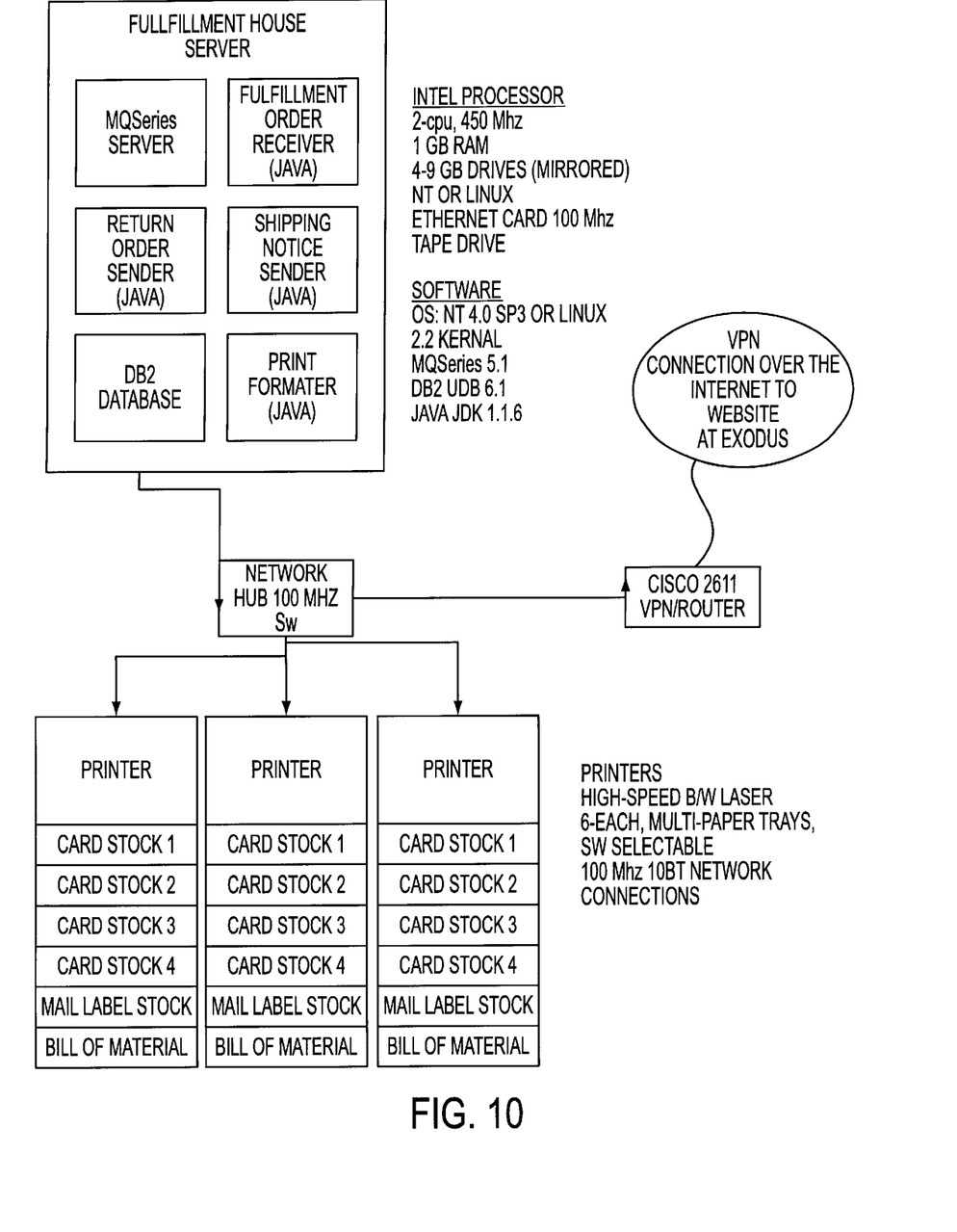
FIG. 10 schematically illustrates an exemplary embodiment of the server architecture of the fulfillment house 208 shown in FIG. 3.

FIG. 10 shows an exemplary embodiment of the server architecture of the fulfillment house 208 shown in FIG. 3, which is used to full the orders received for products ordered through the website 200.

The delivered content of the website is preferably designed to by highly interactive using multimedia features to keep the web user interested in the content and product offerings. This content is preferably delivered as a Macromedia Flash file streamed to the user's web browser. Viewing the Flash file may require a plugin from Netscape or the Internet Explorer browser. All presentations to the web user, up to the point of purchase, are preferably from the Flash player plugin executing the Flash file. This Flash file is personalized at the point of request by the Macromedia Generator application executing on the Content Web Server. This personalization includes the insertion of names and other references to enhance the web user's experience when using the website to purchase the CD gift card product 10.

The following provides a base user scenario which occurs when a web user enters the product website. If the web user has used the site previously, they are offered and opportunity to "login". This feature enables some personalization of the web user's session. The exemplary scenario generally operates as follows: 1) the user enters data about the intended gift recipient; 2) the user selects theme elements such as humorous, romantic, etc.; 3) the user selects specific content elements corresponding to the selected theme; 4) the user enters a detailed massage; 5) the user then completes the purchase using a supported process; 6) the financial processing service authorizes payment; 7) the user is notified that the purchase has been authorized and is given a tracking reference; 8) a detailed order is forwarded to the fulfillment house and placed in a fulfillment queue; 9) e-mail notification is then sent to the user confirming the order; and 10) when the order is shipped, a second e-mail notice is sent to the user confirming shipment.

In accordance with another embodiment of the invention, the website may provide a service which enables users to record addresses and dates for a plurality of people for whom they would like to be reminded, by e-mail or otherwise, of upcoming dates related thereto. For example, the user could enter the name, address and birthday information, on a personal web page or the like, for all of the people in his/her family, which information is then stored in a database by the website. The system is then programmed to send reminders to the user informing the user of the upcoming birthday, which reminder then gives the user the opportunity to order a customized CD gift for the family member as described above. The website may provide database management functions to the users which enables the users to edit, add and delete information from their personal database or web page records. The personal page may show orders placed in the past, orders shipped, orders confirmed, number of days until recorded person's birthdays and/or the like information which enables the user to keep track of and manage information on people and special occasions.

As is apparent from the description above, the instant invention enables personalized CD gift cards to be easily and quickly made in a fun and exciting manner. When a purchaser buys the card they can easily add a personalized message as well as customize the CD presentation for the particular intended recipient. The invention provides a customized CD gift card that can be viewed by the recipient at any time through use of a computer, as well as provides an effective and efficient system and method for enabling the personalization of the CD.

In accordance with the invention, and as a direct result of the foregoing, the invention enables a first person to provide a second person with an enjoyable, interesting and/or exciting customized multi-media experience, as a gift without having to actually "burn" a custom CD. However, the invention also includes and provides a more enhanced overall customization by combining the features described above with a "light burn" on the CD which may include data relating to photos, voice or videos uploaded to the website's database by the first person, which would subsequently be sent via the VPN to the replication fulfillment house database or may be resident thereon and burned onto the CD for a particular recipient. This would provide a hybrid of technologies and would include the selection of customized information from the standard non-customized information as well as enable the sender to include additional customized information not available in the standard non-customized information on the CD. This alternative embodiment of the invention will become more economical as CD replication technology advanced sufficiently to allow replication at a rate which would enable for unit production sufficient to accommodate a reasonable market share.

While the preferred forms and embodiments of the invention have been illustrated and described, it will be apparent to those of ordinary skill in the art that various changes and modifications may be made without deviating from the inventive concepts and true spirit of the invention as set forth above, and it is intended by the appended claims to cover all such changes and modifications which come within the true spirit and scope of the present invention.

What is claimed is:

1. A method for enabling a first person to produce a customized gift for a second person, said gift comprising the combination of a computer-readable storage medium bearing non-customized information and a control program for controlling access by a user to select non-customized information, and a card bearing customized information and a customization code, the method comprising the steps of:
    providing a host system for receiving instruction from a first person to create a customized gift for a second person;
    directing said host system to receive data from said first person which relates to said second person;
    displaying to said first person a representation of a limited collection of non-customized information corresponding to said data received from said first person;
    prompting said first person to selectively modify and save said limited collection of non-customized information to said host system;
    using said saved limited collection of non-customized information to generate a customization code;
    providing to said second person, in combination, a card bearing said customization code and a computer-readable storage medium having a control program and said non-customized information stored thereon;
    directing said control program to prompt said second person to input said customization code; and
    directing said control program to use said customization code to enable said second person to access said limited collection of said non-customized information to provide a customized display to said second person.

2. The method of claim 1, further comprising the step of: prior to providing said gift to said second person, prompting said first person to transmit to said host system a personalized message to be printed on said card.

3. The method of claim 1, further comprising the step of: directing said host system to associate a unique identifier with said saved limited collection of non-customized information.

4. The method of claim 3, further comprising the step of using said unique identifier to generate said customization code, wherein said customization code comprises a first portion generated from said saved limited collection of non-customized information, and a second portion generated from said unique identifier.

5. The method of claim 1, wherein the step of directing said host system to receive data from said first person includes receiving said data electronically.

6. The method of claim 1, wherein the step of directing said host system to receive data from said first person includes providing an Internet website which prompts said first person to input said data.

7. The method of claim 1, wherein the step of directing said host system to receive data from said first person includes prompting said first person to enter at least a month of birth of said second person, and further wherein said non-customized information includes displayable information relating to each of a plurality of months.

8. The method of claim 1, wherein said non-customized information includes information relating to a plurality of possible gift items, and the step of directing said host system to receive data from said first person includes obtaining data from said first person identifying which of said plurality of gift items to display to said second person.

9. The method of claim 1, wherein said control program is operable to present a customized audio and visual display to said second person based on said control code.

10. The method of claim 1, further comprising the step of receiving a personal message from said first person, and providing said personal message to said second person with said card and said computer-readable storage medium.

11. The method of claim 10, wherein said personal message is obtained electronically from said first person.

12. The method of claim 1, wherein the step of directing said host system to receive data from said first person includes requesting the first person to select a theme for the customized display from a plurality of possible themes, and further wherein said non-customized information includes displayable information corresponding to each of said plurality of possible themes.

13. A method for enabling a first person to produce a customized gift for a second person, said gift comprising the combination of a computer-readable storage medium bearing non-customized information and a control program for controlling access by a user to select non-customized information, the method comprising the steps of:
    providing a host system for receiving instruction from a first person to create a customized gift for a second person;
    directing said host system to receive data from said first person which relates to said second person;
    displaying to said first person a representation of a limited collection of non-customized information corresponding to said data received from said first person;
    prompting said first person to selectively modify and save said limited collection of non-customized information to said host system;
    using said saved limited collection of non-customized information to generate a customization code;
    storing said customization code in a database together with a unique identifier for a computer-readable storage medium having a control program and said non-customized information stored thereon;
    providing said computer-readable storage medium to said second person;

directing said control program to access said database and obtain said customization code based on said unique identifier; and directing said control program to use said customization code to enable said second person to access said limited collection of said non-customized information to provide a customized display to said second person.

14. The method of claim 13, further comprising the step of:

after the step of providing said computer-readable storage medium to said second person, directing said control program to transmit said unique identifier to said host system.

15. The method of claim 13, further comprising the step of:

prior to tile step of providing said computer-readable storage medium to said second person, prompting said first person to transmit to said host system a personalized message; and after the step of directing said control program to access said database, transmitting said personalized message to said second person.

16. The method of claim 13, wherein the step of directing said host system to receive data from said first person includes receiving said data electronically.

17. The method of claim 13, wherein the step of directing said host system to receive data from said first person includes providing an Internet website which prompts said first person to input said data.

18. The method of claim 13, wherein the step of directing said host system to receive data from said first person includes prompting said first person to enter at least a month of birth of said second person, and farther wherein said non-customized information includes displayable information relating to each of a plurality of months.

19. The method of claim 13, wherein said non-customized information includes information relating to a plurality of possible gift items, and the step of directing said host system to receive data from said first person includes obtaining data from said first person identifying which of said plurality of gift items to display to said second person.

20. The method of claim 13, wherein said control program is operable to present a customized audio and visual display to said second person based on said control code.

21. The method of claim 13, wherein the step of directing said host system to receive data from said first person includes requesting the first person to select a theme for the customized display from a plurality of possible themes, and further wherein said non-customized information includes displayable information corresponding to each of said plurality of possible themes.

22. A method for enabling a first person to produce a customized gift for a second person, said gift comprising the combination of a computer-readable storage medium bearing non-customized information and a control program for controlling access by a user to select non-customized information, the method comprising the steps of:

providing a host system for receiving instruction from a first person to create a customized gift for a second person, said host system comprising a database of unique identifiers for a plurality of computer-readable storage mediums each bearing non-customized information and a control program;

directing said host system to receive a unique identifier from said first person identifying a specific one of said computer-readable storage mediums;

directing said host system to receive data from said first person which relates to said second person;

displaying to said first person a representation of a limited collection of non-customized information corresponding to said data received from said first person;

prompting said first person to selectively modify and save said limited collection of non-customized information to said host system;

using said saved limited collection of non-customized information to generate a customization code associated with said unique identifier;

directing said control program to access said database and obtain said customization code associated with said unique identifier; and directing said control program to use said customization code to enable said second person to access said limited collection of said non-customized information to provide a customized display to said second person.

23. The method of claim 22, said step of directing said control program to access said database and obtain said customization code further comprising the steps of:

directing said control program to automatically transmit said unique identifier to said host system; and directing said host system to transmit said customization code associated with said unique identifier to said second person.

24. The method of claim 22, further comprising the step of:

prior to the step of directing said control program to access said database, prompting said first person to transmit to said host system a personalized message; and after die step of directing said control program to access said database, transmitting said personalized message to said second person.

25. The method of claim 22, wherein the step of directing said host system to receive data from said first person includes receiving said data electronically.

26. The method of claim 22, wherein the step of directing said host system to receive data from said first person includes providing an Internet website which prompts said first person to input said data.

27. The method of claim 22, wherein the step of directing said host system to receive data from said first person includes prompting said first parson to enter at least a month of birth of said second person, and further wherein said non-customized information includes displayable in formation relating to each of a plurality of months.

28. The method of claim 22, wherein said non-customized information includes information relating to a plurality of possible gift items, and the step of directing said host system to receive data from said first person includes obtaining data from said first person identifying which of said plurality of gift items to display to said second person.

29. The method of claim 22, wherein said control program is operable to present a customized audio and visual display to said second person based on said control code.

30. The method of claim 22, wherein the step of directing said host system to receive data from said first person includes requesting the first person to select a theme for the customized display from a plurality of possible themes, and further wherein said non-customized information includes displayable information corresponding to each of said plurality of possible themes.

* * * * *